O. KRAUSE.
SPRING MOTOR POWER FOR DRIVING AUTOMOBILES.
APPLICATION FILED JUNE 1, 1918.

1,303,483. Patented May 13, 1919.

Witnesses:

Inventor
Oscar Krause
Attorney

UNITED STATES PATENT OFFICE.

OSCAR KRAUSE, OF LEHR, NORTH DAKOTA.

SPRING-MOTOR POWER FOR DRIVING AUTOMOBILES.

1,303,483.     Specification of Letters Patent.     Patented May 13, 1919.

Application filed June 1, 1918. Serial No. 237,680.

*To all whom it may concern:*

Be it known that I, OSCAR KRAUSE, a citizen of the United States, residing at Lehr, in the county of McIntosh and State of North Dakota, have invented certain new and useful Improvements in Spring-Motor Power for Driving Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in spring power driving apparatus for automobiles, and comprises a simple and efficient device of this nature, having various details of construction, combinations and arrangements of parts which will be hereinafter fully described, shown in the accompanying drawings and then specifically defined in the appended claims.

I illustrate my invention in the accompanying drawings which, with the letters of reference marked thereon, form a part of this specification and in which.

Figure 2:
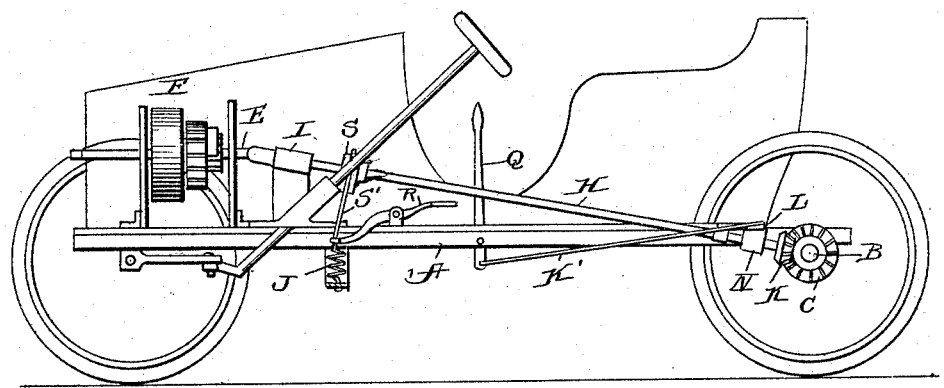
Fig. 2 is a side elevation.
Figure 1:
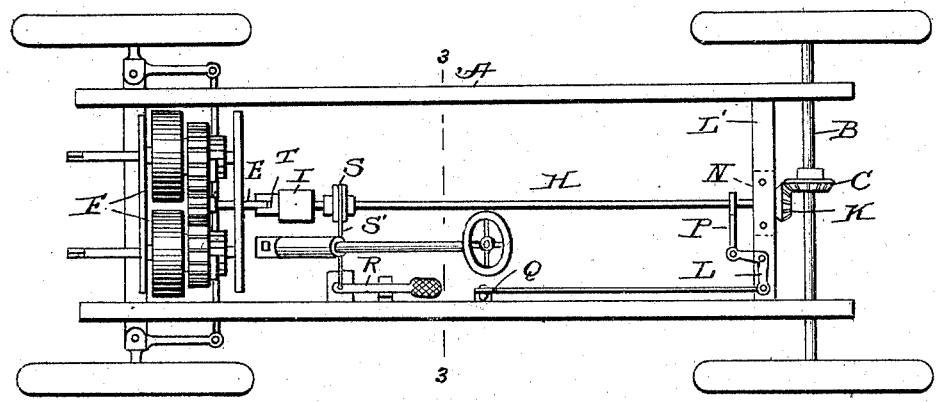
Figure 1 is a top plan view.

Reference now being had to the details of the drawings by letters:—

A designates the chassis of an automobile having an axle B journaled in suitable bearings therein and provided with a beveled gear wheel C. F, F designate spring motors, two being shown in the drawings in order to furnish the necessary power to drive the apparatus, and which motors are mounted upon the forward end of the chassis, and which motors have a common driving shaft E to which they are geared. A transmission shaft H is mounted at its forward end in the bearings I and the rear end of the shaft is journaled in bearings N in which the rear end of the shaft may have a lateral swinging movement, for the purpose of throwing the beveled gear K fixed to the shaft into or out of mesh with the beveled gear upon the driving axle. A lever Q is pivoted to the chassis, and K' is a rod pivotally connecting the same with an angle lever L pivoted to the cross piece L' of the chassis, and P is a rod pivotally connecting one end of said angled lever with the shaft near its rear end, and affords means whereby, when the lever is actuated, the beveled gear wheels may be thrown into or out of mesh. The forward end of said shaft is provided with a slot T adapted to receive the flattened end of the driving shaft.

A wheel S is fixed to the transmission shaft and S' is a friction band fastened at one end to the cross piece of the chassis and its other end is secured to a pivotal lever R mounted upon the chassis, and forms a convenient means whereby the operator may regulate the movement of the transmission shaft. A coiled spring J is fastened at one end to the chassis and its other end to the lever and serves to normally hold the forward end of the lever down and the band applied to the friction wheel.

In operation, the springs are wound up by suitable crank mechanism and the friction band will hold the transmission shaft from rotary movement. When it is desired to permit the transmission shaft to impart power from the motor to the driving axle, it may be done by the operator tilting the spring pressed lever and releasing the band from the brake wheel. The mechanism for throwing the transmission shaft into and out of gear will be under the control of the operator through the medium of the lever actuated mechanism.

What I claim to be new is:

1. A spring motor driven apparatus for automobiles, comprising in combination with a chassis, a driving axle journaled therein, a spring motor, a driving shaft geared thereto, a swinging transmission shaft mounted upon the chassis and adapted to be thrown into and out of gear connection with the driving axle, and means for controlling the rotary movement of said transmission shaft.

2. A spring motor driven apparatus for automobiles, comprising in combination with a chassis, a driving axle journaled therein, a spring motor, a driving shaft geared thereto, a swinging transmission shaft mounted upon the chassis and adapted to be thrown into and out of gear connection with the driving axle, and friction means for controlling the movement of the transmission shaft.

3. A spring motor driven apparatus for automobiles, comprising in combination with a chassis, a driving axle journaled therein, a spring motor, a driving shaft geared thereto, a swinging transmission shaft mounted upon the chassis and adapted to be thrown into and out of gear connection with the driving axle, a friction wheel fixed to the transmission shaft, a friction band fixed at one end to a part of the chassis, a foot-actuated lever to which the other end of the band is connected, said band adapted to engage the friction wheel to control the rotary movement thereof.

In testimony whereof I hereunto affix my signature in presence of two witnesses.

OSCAR KRAUSE.

Witnesses:
 I. E. GIEDT,
 F. KRAUSE.

Copies of this patent may be obtained for five cents each, by addressing the "Commissioner of Patents, Washington, D. C."